(12) United States Patent
Sakakibara et al.

(10) Patent No.: US 6,783,886 B1
(45) Date of Patent: Aug. 31, 2004

(54) BATTERY PACK WITH AN IMPROVED COOLING STRUCTURE

(75) Inventors: Kazuyuki Sakakibara, Okazaki (JP); Youichi Kato, Nagoya (JP); Hisakazu Okabayashi, Anjo (JP)

(73) Assignee: Makita Corporation, Anjo (JP)

( * ) Notice: Subject to any disclaimer, the term of this patent is extended or adjusted under 35 U.S.C. 154(b) by 118 days.

(21) Appl. No.: 09/707,723

(22) Filed: Nov. 7, 2000

(30) Foreign Application Priority Data

Nov. 11, 1999 (JP) ............................................. 11-321621
Sep. 27, 2000 (JP) ...................................... 2000-293719

(51) Int. Cl.$^7$ ............................................ H01M 10/50
(52) U.S. Cl. ........................................ 429/99; 429/120
(58) Field of Search ............................ 429/96–100, 120

(56) References Cited

U.S. PATENT DOCUMENTS 6,537,694 B1 * 3/2003 Sugiura et al. ............. 429/120
6,566,005 B1 * 5/2003 Shimma et al. ............. 429/148

FOREIGN PATENT DOCUMENTS

| | | |
|---|---|---|
| DE | 10055158 A1 | 7/2001 |
| EP | 920 105 A2 | 6/1999 |
| EP | 0 940 864 A2 | 9/1999 |
| EP | 0 994 523 A1 | 4/2000 |
| JP | 2000-133225 A * | 5/2000 |

* cited by examiner

Primary Examiner—Susy Tsang-Foster
(74) Attorney, Agent, or Firm—Lahive & Cockfield, LLP; Anthony A. Laurentano

(57) ABSTRACT

A battery pack (1) includes an outer enclosure (2) and a forked air passage (72) for introducing cooling air via the intake port (9) formed in an outer enclosure (2), sending the air between cell groups (70) and (71) which contain cells (14a–14f), and discharging it from the outer enclosure at discharge ports (11). Two metallic radiator plates (73) partially define the air passage so as to be in contact with the side cells (14a–14d), whereas a circular radiator plate (74) made of synthetic resin also partially define the air passage so as to be in contact with the center cells (14e, 14f). The contact areas of the side cells with the metallic radiator plates (73) are varied in order to achieve even cooling of the cells. The upstream portion of the synthetic resin radiator plate has a thicker wall than the downstream portion to achieve the same purpose.

38 Claims, 13 Drawing Sheets

BATTERY PACK WITH AN IMPROVED COOLING STRUCTURE

This application claims priority on Japanese Patent Application No. 11-321621 filed on Nov. 11, 1999 and Japanese Patent Application No. 2000-293719 filed on Sep. 27, 2000.

BACKGROUND OF THE INVENTION

1. Field of the Invention

The present invention relates to a battery pack containing a plurality of cells for use with a charger or battery-powered devices, such as power tools, as a power source. More particularly, the invention relates to a battery pack with an improved structure for cooling the cells during a charge.

2. Description of the Related Art

A conventional battery pack includes on the top surface thereof a mounting portion which in turn includes electrical terminals for the establishment of electrical contact between the battery pack and a charger or a battery-powered device, such as an electric power tool. The battery pack can be recharged by attachment of its mounting portion onto the charger, and also can be used as a power source by attachment of the mounting portion onto a battery-powered device. However, the cells of the battery pack tend to generate heat during each charge, which results in degradation of the cells. To avoid such a disadvantage, a means for cooling the battery cells is typically provided in the battery pack. For example, disclosed in Japan Published Unexamined Patent Application No. 11-219733 is a battery pack which is provided with a cooling structure therein. The structure includes air passages running through the battery pack case and along and between the cells within the battery pack and a plurality of apertures forming intake and discharge ports provided at the top and bottom portions of the battery pack, whereby the intake ports are disposed at a mounting portion to which a charger is attached, with the air passages in communication with both the intake and discharge ports. Thus, cooling air from a blower or fan incorporated in the charger can be introduced from the intake ports to be sent into the interior of the pack through the air passages and outside the pack from the discharge ports so that the heat generated by the cells during a charge is dissipated therefrom.

While the foregoing battery pack with a cooling structure for the battery cells contained therein achieves its intended objective, it is not free from certain problems and inconveniences, thus leaving room for improvement. For example, in the above described structure, the temperature of cooling air drawn into the battery pack case increases due to heat exchanged by the cells as the air flows downstream, i.e. further in the direction of the air flow, thus resulting in a decreased cooling effect of the air downstream. In addition, as the cooling air comes into direct contact with the cells for cooling, the area of contact with the cooling air varies from cell to cell, such that the cells cannot be evenly or equally cooled. Such an uneven cooling effect often results in certain cells having higher temperatures than those of others, thereby allowing the cells with higher temperatures to reach the end of their service life faster than other cells. This by extension shortens the service life of the entire battery.

The cells in a battery pack may be unevenly or unequally cooled due to other causes. For example, a cell or cells may experience a greater heat buildup if surrounded by other cells, thus creating an uneven temperature condition in the cells whether the surrounded cell or cells are located relatively downstream or upstream in the cooling airflow.

SUMMARY OF THE INVENTION

In view of the above-identified problems, an important object of the present invention is to provide a battery pack that can suppress increases in temperature of the cooling air downstream in the cooling airflow so as to produce an even cooling effect on all the cells contained in the battery pack.

Another object of the present invention is to provide a battery pack that can ensure a proper temperature balance among the cells in order to prolong the service life of the cells contained therein.

Still another object of the present invention is to provide a battery pack that can more effectively counter variations in temperature of the cells due to, for example, increases in temperature of the cooling air in the pack in order to prolong the service life of the cells and thus the battery pack.

Yet another object of the present invention is to provide a battery pack in which the temperature of all the cells, including those surrounded by others, is maintained at about the same level, preventing shortened service life of certain cells in the battery.

The above objects and other related objects are realized by the invention, which provides a battery pack comprising: a case containing a plurality of cells; at least one air passage formed within the case for allowing cooling air outside the case to enter the case, pass along and/or between the cells, and exit from the case, and at least one radiator provided in the at least one air passage so as to be in contact with outer surfaces of the cells, wherein the heat capacity of the at least one radiator increases in the downstream direction of a flow of the cooling air. By the provision of a radiator in the at least one air passage so as to be in contact with outer surfaces of the cells in such a manner as to increase the heat capacity of each plate in the downstream direction of cooling airflow, the battery pack can effectively control increases in temperature of the cell, and maintain a proper temperature balance among the cells by the cooling effect of the at least one radiator, thereby prolonging the service life of the entire battery.

According to one aspect of the present invention, the aforementioned increase in the heat capacity is achieved by increasing at least one of the surface area and the volume of the at least one radiator. By increasing the surface areas and volumes of the at least one radiator as above, the heat capacity of the radiator can also be easily increased in the downstream direction.

According to another aspect of the present invention, each radiator has a cross-section, transverse to the direction of the flow of the cooling air, that progressively increases in size along the direction of the flow.

According to still another aspect of the present invention, each radiator is contoured to conform to the outer surfaces of the cells. By conforming the surfaces of each radiator to the outer surfaces of the cells, the cells can be more evenly and efficiently cooled.

According to one feature of the present invention, each radiator is a generally rectangular plate having an inner surface contoured to conform to the outer surfaces of the cells and an outer surface opposite the inner surface, with the outer surface of each plate having a plurality of radiator fins thereon protruding into the respective air passage.

According to yet another aspect of the present invention, the radiator fins includes a plurality of horizontal fins with different lengths. The fins are arranged in parallel both with respect to any of the other fins and to the direction of the cooling airflow such that the heat capacity of each radiator increases in the downstream direction of the cooling air.

The invention is also directed to a battery pack comprising: a case containing a plurality of cells; at least one air passage formed within the case for allowing cooling air outside the case to enter the case, pass along and/or between the cells, and exit from the case; and radiator means provided in the at least one air passage so as to be in contact with outer surfaces of the cells, the radiator means having portions each of which corresponds to at least one of the cells, wherein the portions have different heat capacities according to the heat conditions of the corresponding cells.

This arrangement can more effectively counter variations in temperature of the cells that occur due to, for example, increases in temperature of the cooling air in the pack, maintaining a proper temperature balance among the cells. Accordingly, this counters the problem of certain cells reaching the end of their life span faster than others, thus increasing the service life of the entire battery even more effectively. Moreover, the charging time is shortened as the cells of this embodiment are well protected against excessive heat buildup. That is, in conventional battery chargers, the charging circuitry is protected by a reduction in the charging current, which results in longer charging times. However, the relationship between temperature and charging time also means that cooling allows the charging current to be similarly increased, thus shortening the charging time.

According to still another feature of the present invention, the heat capacity of each portion of the radiator means is determined by the area of contact of the portion with the corresponding cell.

Alternatively, the heat capacity of each portion of the radiator means is determined by the thickness of the portion.

Alternatively, the heat capacity of each portion of the radiator means is determined by the material of the portion.

Moreover, the heat capacity of each portion of the radiator means is determined by any combination of the area of contact of the portion with the corresponding cell the thickness of the portion, and the material of the portion.

According to yet another feature of the present invention, the cells are divided into at least one first cell group and at least one second cell group, each cell group including at least one cell and having different heat conditions, and the radiator means includes a plurality of radiator plates having different heat capacities, each radiator plate being in contact with one of the first and second cell groups. Proper heat capacity can be even more easily and accurately determined for each portion of the radiator means.

According to one practice of the present invention, the battery pack comprises one first cell group located generally in the center thereof and two second cell group opposing the first cell group along branches of the at least one air passage.

According to another practice of the present invention, the radiator plates include a first radiator plate and two second radiator plates, the first radiator plate surrounding the first cell group around its entire periphery and each of the second radiator plates abutting inner surfaces of one of the second cell groups, and wherein the first radiator plate has a smaller heat capacity than each of the second radiator plates.

According to still another practice of the present invention, the first radiator plate is made of a synthetic resin and each second radiator plate is made of at least one metal selected from a group consisting of aluminum, copper, and iron.

According to yet another practice of the present invention, the portions of the second radiator plate become thicker in a stepwise manner along the downstream direction of a flow of the cooling air.

In one aspect, the first radiator plate and the second radiator plates have a plurality of portions corresponding to different cells and adapted to remove heat from the corresponding cells, the portions having different heat capacities according to the heat conditions of the corresponding cells.

In another aspect, the heat capacity of each portion of each second radiator plate is determined by the area of contact of the portion with the corresponding cell.

In one embodiment, the heat capacity of each portion of the first and second radiator plates is determined by the thickness of the portion.

In another embodiment, the heat capacity of each portion of each second radiator plate is determined by any combination of the area of contact of the portion with the corresponding cell and the thickness of the portion.

In accordance with another aspect of the present invention, the second cell groups are symmetrical and include an equal number of cells and the first cell group includes fewer cells than each of the second cell groups.

In accordance with still another aspect of the present invention, each second cell group has inner surfaces in contact with one of the second radiator plates, and each second cell group is arranged in a single row of cells bent at one intermediate cell toward the inner surface, the portion of each second radiator plate corresponding to the intermediate cell including two bulges adjacent to the intermediate cell.

In accordance with yet another aspect of the present invention, each bulge is thicker than the remainder of the second radiator plate.

Other general and more specific objects of the invention will in part be obvious and will in part be evident from the drawings and descriptions which follow.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

The preferred embodiment according to the present invention will be described hereinafter with reference to the attached drawings.

Embodiment 1

Figure 1:
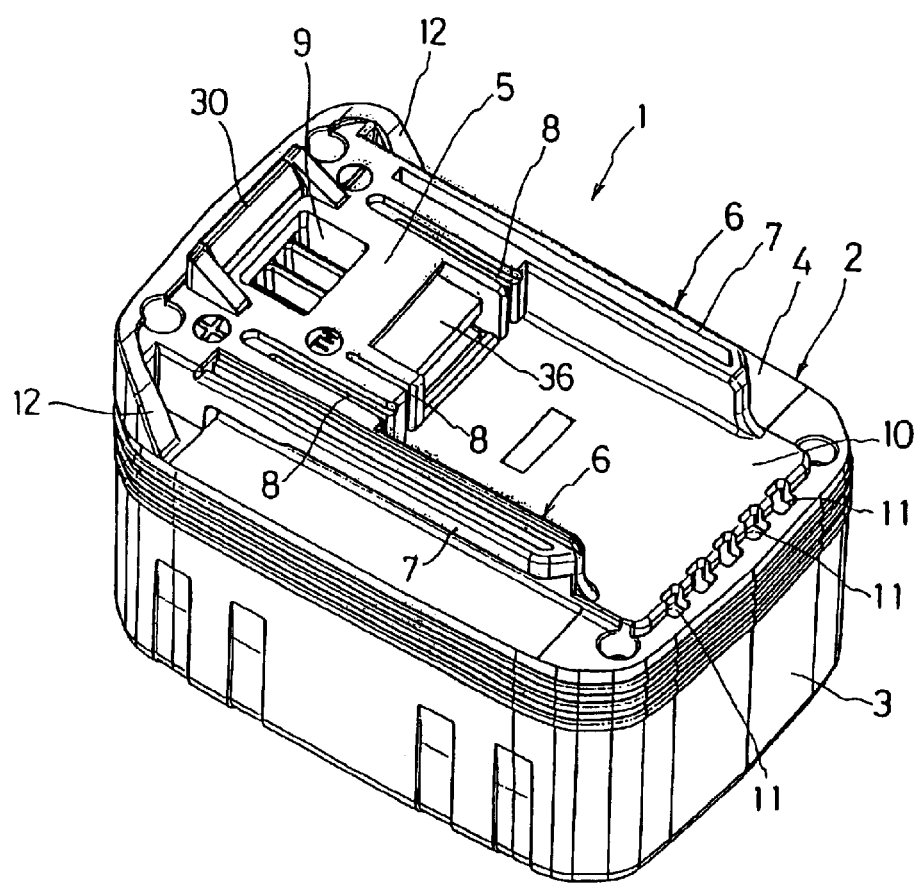
FIG. 1 is a perspective view of a battery pack in accordance with the present invention.
Figure 2:
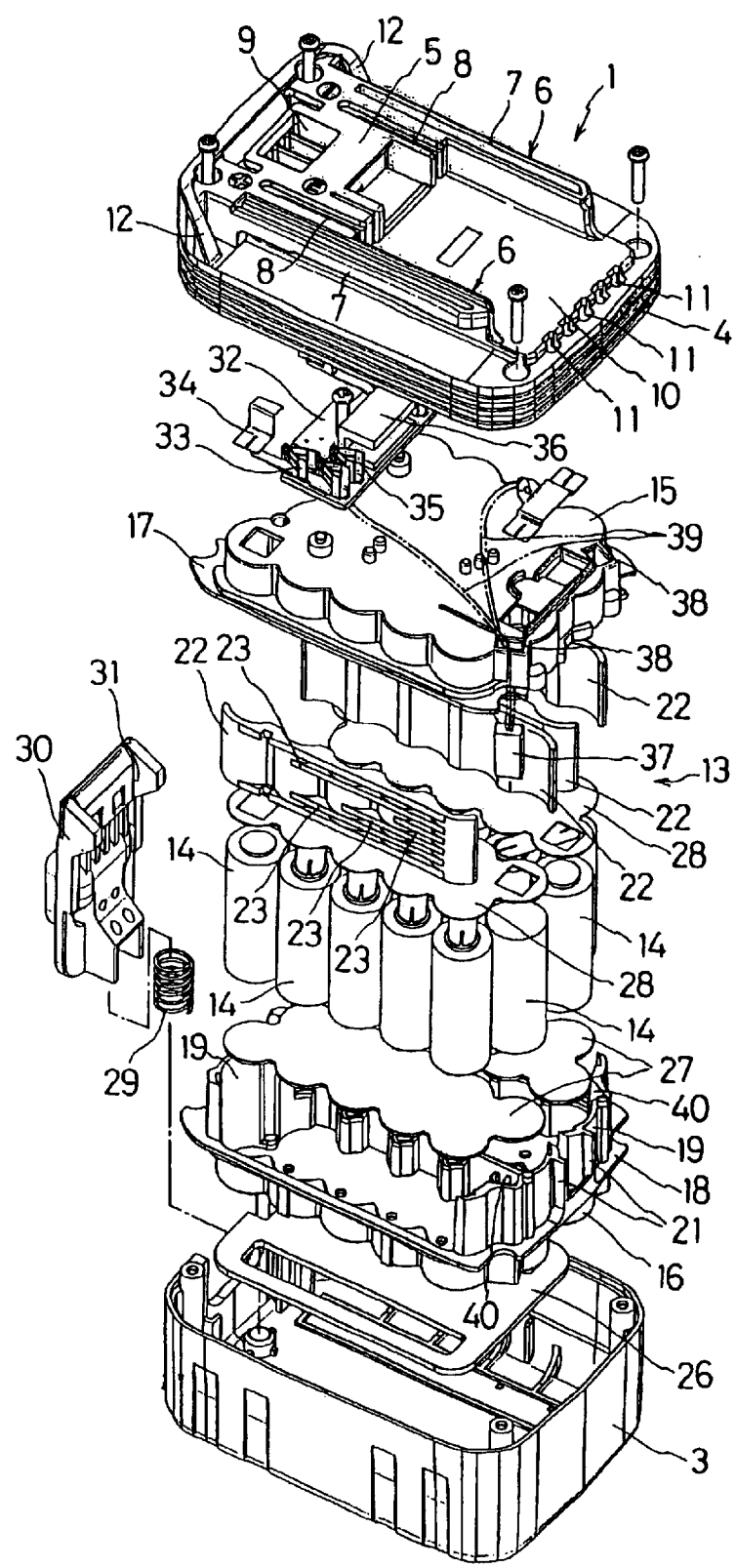
FIG. 2 is an exploded perspective view of the battery pack of FIG. 1.

FIG. 1 is a perspective view of a battery pack 1 in accordance with the present invention and FIG. 2 is an exploded perspective view of the battery pack 1. Referring to FIGS. 1 and 2, the battery pack 1 is formed of a double-structured enclosure. The battery pack 1 includes an outer enclosure 2 and inner case 13 which contains a plurality of cells, with the outer enclosure 2 housing the inner case 13. In addition, the inner case is formed smaller than the outer enclosure so as to fit snugly within the outer enclosure. The outer enclosure 2 includes a lower enclosure 3 generally housing the inner case 13 and an upper enclosure 4 attached to the lower enclosure 3 with a plurality of screws which are tightened downward along the height of the lower enclosure 3. Provided on the top surface of the upper enclosure 4 forming a common mounting portion to which a charger or power tools (as will be described later) is to be attached are a top end 5 and a pair of parallel slide rails 6 extending in a forward direction from the top end 5 (in the direction opposite the top end 5 from the center of the pack's top surface). Each slide rail 6 includes an outwardly extending flange 7 along the entire length of the rail 6, thus forming an L-shaped cross section on a plane which extends orthogonal to the aforementioned forward direction. Provided at the top end 5 between and parallel to the pair of parallel slide rails 6 are slits 8. Provided in the central rear portion of the top end 5 in the upper enclosure 4 is a rectangular intake port 9 which passes through the upper enclosure 4. Also provided in the upper enclosure 4 forward of the top end 5 are discharge ports 11 which open to the external environment on the boundary of a step 10 formed between the pair of slide rails 6.

The inner case 13 includes a synthetic resin upper holder 15 and a lower holder 16 which are affixed to the upper and lower sides, respectively, of an assembly of twenty cells 14 held therein, the cells 14 being arranged in four rows of five cells each, with belt-shaped metal radiator plates 22 provided between the upper holder 15 and lower holder 16. The upper holder 15 and lower holder 16 are shaped and dimensioned so as to snugly and stably encase the cells 14. Furthermore, ribs 17 and 18 having edges which conform to the inner surface of the lower enclosure 3 are provided along the lower rim of the upper holder 15 and the upper rim of the lower holder 16, respectively, so as to prevent jarring or rattling of the cells within the outer enclosure 2 when the inner case 13 is held therein. Furthermore, in this structure, the cells 14 are spaced apart and separated into two groups (each of the divided groups of cells 14 hereinafter is referred to as a "cell group") held by the upper holder 15 and lower holder 16, with each group containing half the total number of cells.

Figure 3:
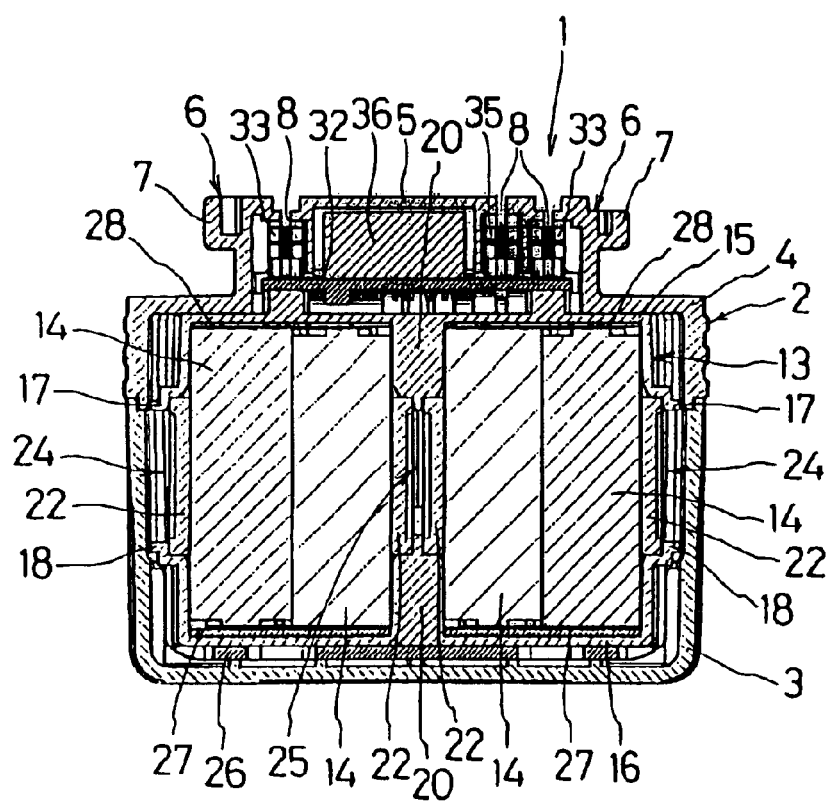
FIG. 3 is a cross-sectional view of the battery pack of FIG. 1.
Figure 5:
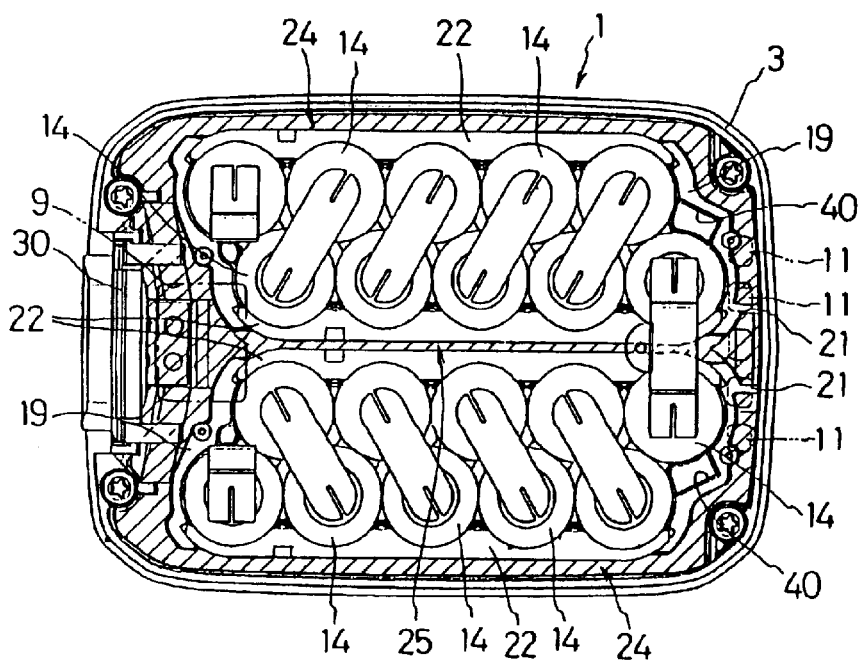
FIG. 5 is a top plan view of the battery pack of FIG. 1 with the upper enclosure and upper holder removed.
Figure 6:
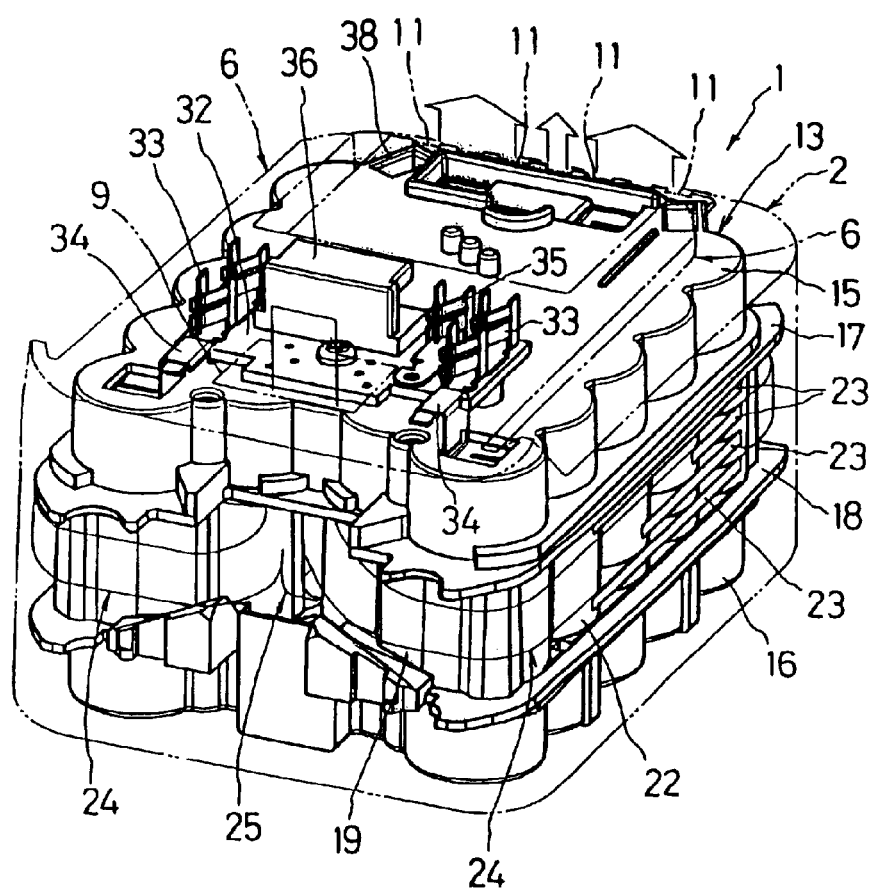
FIG. 6 is a perspective view of the inner case of the battery pack of FIG. 1.

In addition, provided at the front and rear ends of the lower holder 16 are extended portions 19 which protrude from the ribs 18 and are joined to the upper holder 15 such that, as shown in FIGS. 3 and 5, the radiator plates 22 provided on the outer sides of each of the cell groups are secured by being fitted between the upper holder 15 and lower holder 16 horizontally along the lengthwise direction between the ribs 17 and 18 and the cells 14, and vertically in the shorter direction between the extended portions 19 and cells 14. Similarly, the radiator plates 22 provided between the cell groups are fitted in the lengthwise direction between the respective cell groups and partition plates 20 which protrude between the cell groups from the upper holder 15 and lower holder 16, and in the shorter direction between the extended portions 19 and the cells 14. Furthermore, the surfaces of the radiator plates 22 conform to the projections and recesses of the corresponding surfaces of each row of cells 14 forming the perimeter of the cell groups, thus providing equal contact between the surfaces of the radiator plates 22 and the corresponding outer surface of the cells therein. Additionally, as shown in FIGS. 2 and 6, four fins 23 are formed in parallel on the outer surfaces of the radiator plates 22, beginning at the front end thereof and extending in the rearward direction. With the exception of the uppermost fin, the three lower fins 23 are disposed laterally in a step-like arrangement such that the lengths of the fins increase towards the lowest fin (i.e., the lowest and highest fins are the longest and the second highest fin is the shortest) and thus the surface area and volume of the heat-preventing plates 22 increases with proximity to the front of the battery pack.

Thus, the cell groups are enclosed in a tightly-packed fashion or in a substantially sealed manner within the inner case 13, defining first air passages 24 within the outer enclosure 2, indicated by the hatched area in FIG. 5, which surrounds the inner case 13 between the ribs 17 and 18 and communicates with a second air passage 25 (also indicated by the hatched area) penetrating from the rear to the front of the inner case 13. The forward and rear portions of the rib 17 are recessed so as to provide communication between the intake port 9 and the discharge ports 11 of the upper case 4. Thus, as indicated by the arrows in FIG. 6, the divisions in the interior of the battery pack 1 are formed such that air entering from the air intake port 9 is separated into three airflows which go through the pack, with the first air passages 24 leading from the intake port 9 to the exterior via the discharge ports 11 and the second air passage 25, which penetrates the inner case 13 and extends forward, also exiting to the exterior from the discharge ports 11. Furthermore, referring to FIG. 4, vertically-disposed air current adjustment plates 21 are provided on the front extended section 19 on both sides of the second air passage 25, causing the flow of air through the first air passages 24 and the flow of air through the second air passage 25 to be guided to the exhaust ports 11 independently.

Referring again to FIGS. 2 and 3, also provided are a rubber sheet 26 laid between the bottom surface of the inner case 13 and the inner surface of the lower case 3, sponge sheets 27 laid between the cell groups and the lower holder 16, and insulating sheets 28. Furthermore, provided in the rear of the battery pack 1 are a coil spring 29 and a hook 30 upwardly biased by the coil spring. The hook 30 includes a prong 31 protruding upward through the upper case 4 when the battery pack 1 is assembled as best shown in FIG. 1.

Figure 4:
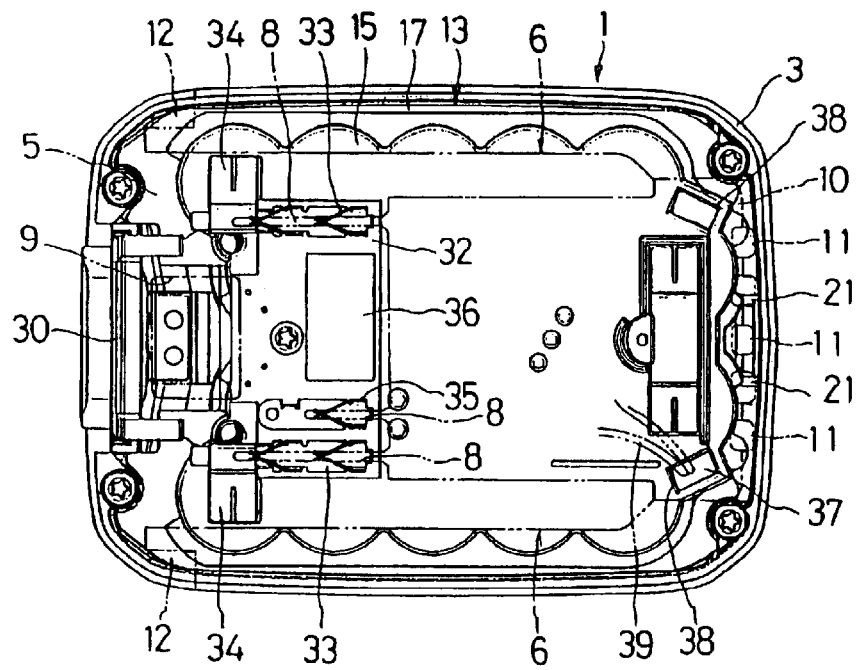
FIG. 4 is a top plan view of the battery pack of FIG. 1 with the upper enclosure removed.

Additionally, a board 32 is secured with screws to the rear of the upper surface of the upper case 15 (shown in FIGS. 2, 4 and 6). Laterally disposed on the upper side of the board 32 are charge/discharge terminals 33. Lead connector plates 34 electrically connect the charge/discharge terminals 33 with the exposed electrodes of the terminal cells of the cell groups through apertures in the upper holder 15. Provided between the charge/discharge terminals 33 on the board 32 are a temperature detection terminal 35 and a connector type data transmission terminal 36. When the board 32 is housed in the outer enclosure 2, the charge terminal 33 and the temperature detection terminal 35 are exposed to the exterior environment through the slits 8 formed in the upper enclosure 4 with the data transmission terminal 36 also exposed in the forward direction. Furthermore, the charge terminal 33 is formed longer than the temperature detection terminal 35 so as to achieve the necessary contact pressure when the battery pack is attached to a power tool.

Furthermore, as shown in FIG. 2, a thermostat 37 is connected to the temperature detection terminal 35. The thermostat 37 and leads 39 pass downward through one of through-holes 38 in the front end of the upper holder 15, and the thermostat 37, in attachment to the bottom holder 16, is inserted between the cells 14 and the extended portion 19 and affixed to the cells 14. Here, an inclined surface 40 is provided on the inner surface of the extended portion 19 so as to keep the thermostat 37 pressed against the cells 14 upon insertion of the temperature sensor.

Figure 7:
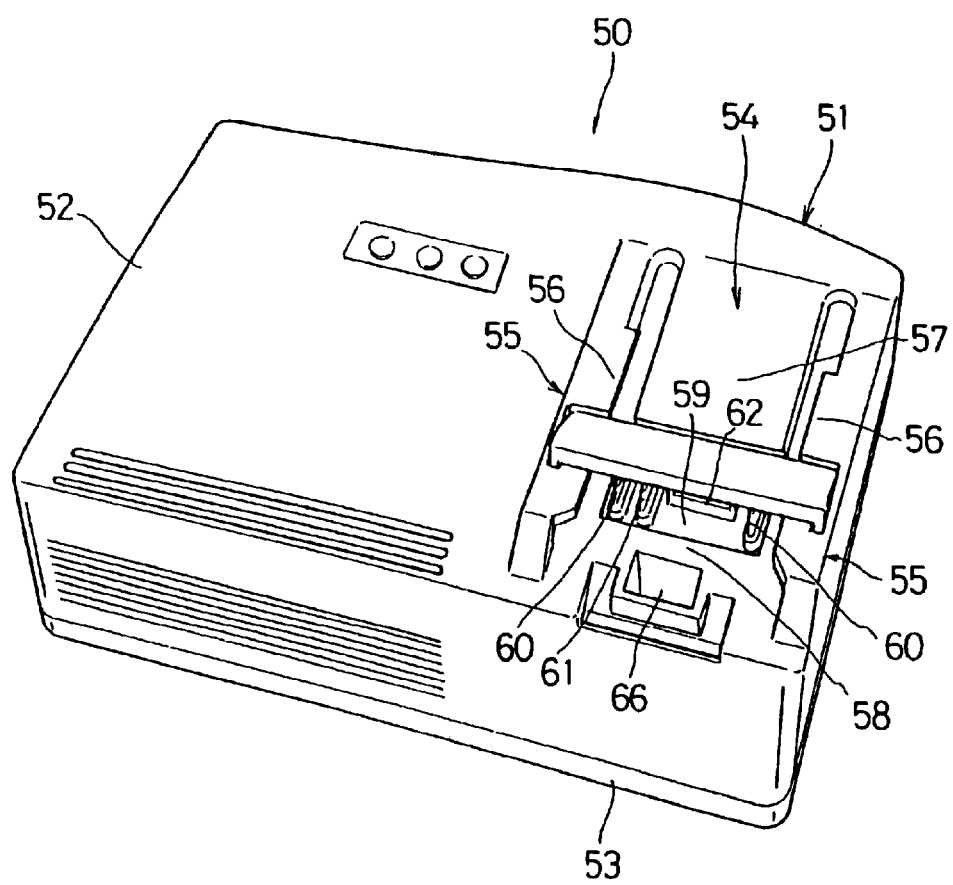
FIG. 7 is a perspective view of a charger for charging the battery pack of FIG. 1.

FIG. 7 shows a perspective view of a charger 50 onto which the battery pack 1 is set. The charger 50 includes a main case 51 with an upper case 52 and a lower case 53, an internal board comprising a charging circuit, and a connecting portion 54 formed integrally in the upper side of the upper case 52 to which the battery pack 1 can be removably attached for charging. The connecting portion 54 includes a pair of parallel guide rails 55 which are spaced apart by a distance greater than the distance between the outermost edges of the flanges 7 of the slide rails 6 on the battery pack 1. In addition, an extension 56 projects a short distance inward from the top surface of each guide rail 55 before extending downward. The slide rails 6 of the inverted battery pack 1 are inserted between the guide rails 55 at the rear of the charger 50 (the closer end of the charger as seen in FIG. 7 will be hereafter referred to as its rear), so that the guide rails 55 can hold the slide rails 6 therebetween. The battery pack 1 is then moved forward with the slide rails 6 sliding along the guide rails 55 until stoppers 12 (see FIGS. 1 and 2) at the farthest rear side of the top end 5 of the battery pack 1 come into abutment with the rear ends of the guide rails 55.

In addition, the connecting portion 54 of the charger 50 includes a front portion 57 and a rear portion 58 which is generally located at a lower plane than the front portion 57 so as to form a transverse step therebetween that spans the guide rails 55. The front portion 57 provides a flat surface which abuts and supports the step 10 of the battery pack 1 when the battery pack 1 is set on the charger 50.

Furthermore, the surface of the connecting portion 54 is sloped generally downward to the front end thereof such that the weight of the battery pack 1 facilitates the battery pack's sliding motion and stabilizes the battery pack 1 when it is set in place.

Figure 8:
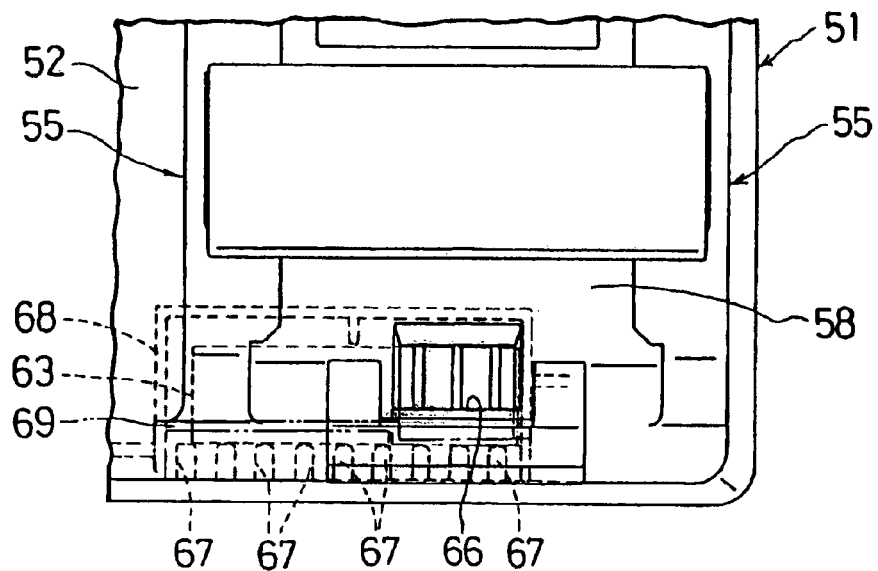
FIG. 8 is a plan view of the portion the charger of FIG. 7 accommodating a fan.
Figure 9:
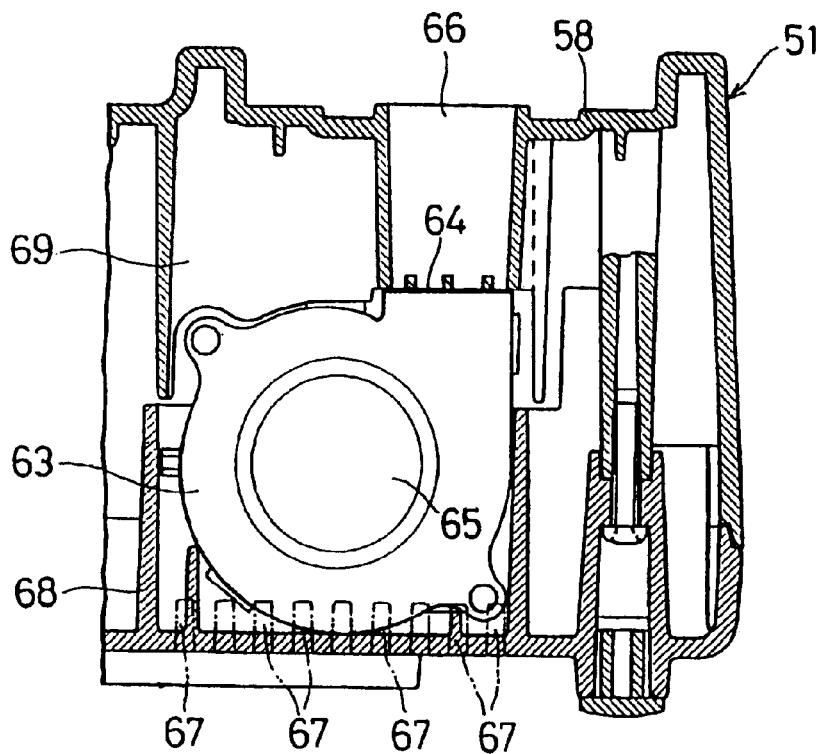
FIG. 9 is a cross-sectional view of the portion accommodating the fan of the charger shown in FIG. 7.

Also provided in the rear portion 58 of the connecting portion 54 is a terminal block 59 which includes charging terminals 60, a temperature detection terminal 61, and a connector type data transmission terminal 62. Referring to FIGS. 8 and 9, a cooling fan 63 is provided inside the charger case 51 rearward of the terminal block 59. The fan 63 is positioned along the longer side of the charger case 56 and has an upwardly-directed airflow supply port 64 connected in communication with a square airflow passageway 66 which is integrally formed in the upper case 52. The cooling fan 63 additionally includes an intake port 65 which faces rearward. Also integrally formed in the lower case 53 are air intake ports 67 for supplying cooling air. Furthermore, a partition wall 68 is provided in the lower case 53 so as to enclose the portion of the fan 63 lying within the lower case 53, whereas a corresponding vertically-disposed partition wall 69 is integrally provided in the upper case 52 so as to conform to the upper surface of the fan 63 other than the portions connecting the airflow supply port 64 and the airflow passageway 66. In this way, only air from the exterior of the charger 50 is supplied to the fan 63 through the intake port 65.

Figure 10:
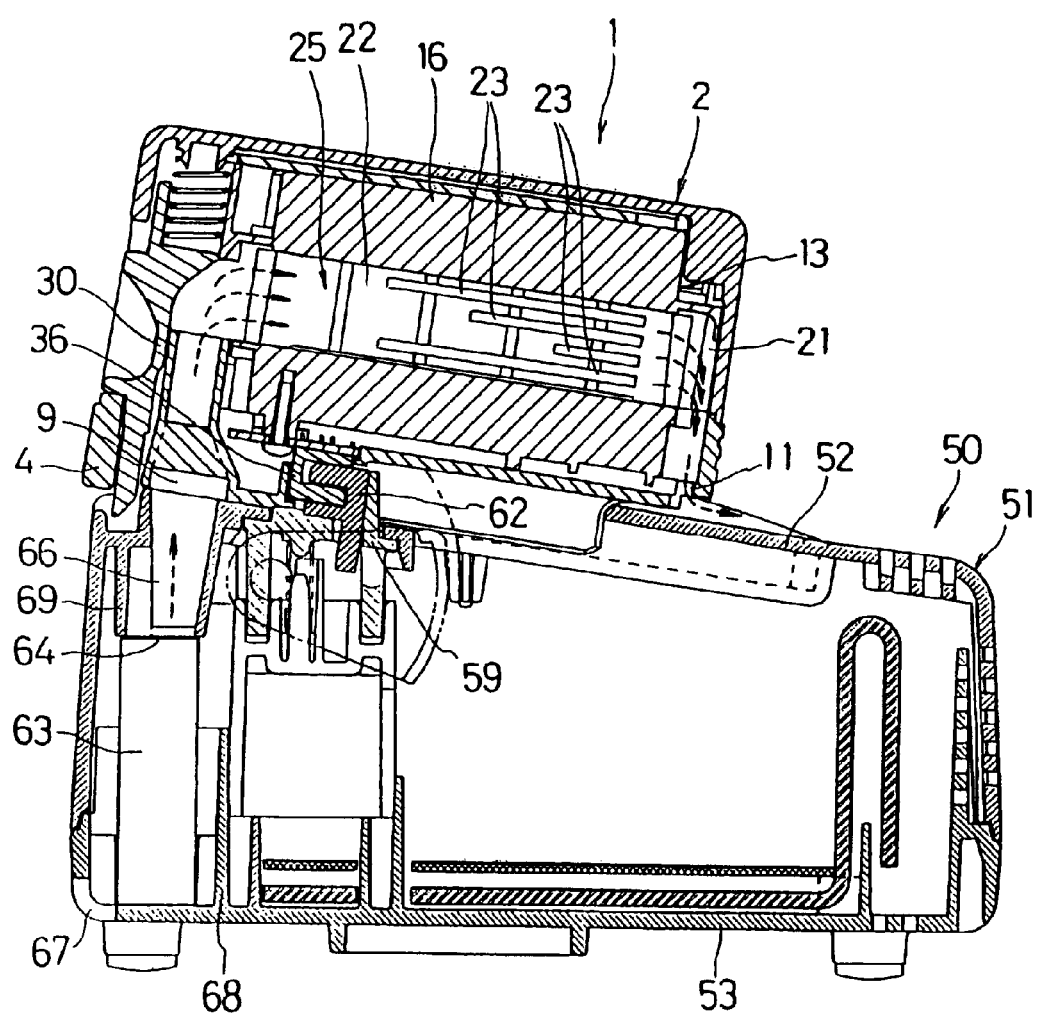
FIG. 10 is a cross-sectional view showing the battery pack of FIG. 1 mounted onto the charger.

During charging of the battery pack 1 thus constructed, when the slide rails 6 of the above mentioned battery pack 1 are placed between the guide rails 55 of the charger 50 and the battery pack slid forward until the pack's stoppers 12 come into abutment with the rear ends of the guide rails 55, charging terminals 60 and a temperature detection terminal 61 in the terminal block 59 advance into the slits 8 of the top end 5 of the battery pack and make electrical contact with the corresponding charge/discharge terminals 33 and the temperature detection terminal 35, respectively, while the data transmission terminals 36 and 62 are also brought into electrical contact, and charging begins. As shown in FIG. 10, in this state of attachment, the air intake port 9 of the battery pack 1 is positioned directly above the airflow passageway 66 of the charger 50, placing both channels in communication with each other.

During a charge, the heat radiator plates 22 radiate the heat generated by the cells 14 that is transferred to the heat radiator plates 22. The fan 63 simultaneously starts operation at the start of charging, thus cooling air drawn through the air intake ports 67 is discharged upwards from the airflow supply port 64, and this airflow, as indicated by the dotted-line arrows, is introduced through the airflow passageway 66 of the charger 50, after which it proceeds through the air intake port 9 and on to the interior of the outer case 2 of the battery pack 1, passes along the first air passages 24 and the second air passage 25 (the airflow along the second air passage 25 is shown in FIG. 10), and is discharged to the exterior from the discharge ports 11. Thus, the radiator plates 22 are cooled by the airflow described above, thereby suppressing increases in temperature of the cells 14. In particular, the number of the fins 23 increases in the downstream direction. Accordingly, even if the temperature of the cooling air increases due to heat exchange by the radiator plates 22 as it flows downstream, the radiator plates' heat capacity, which increases in the downstream direction, can counteract this problem, realizing the cooling effect of the radiator plates along their entire length. In addition, the inner surfaces of the radiator plates 22 conform to the projections and recesses of the corresponding surfaces of each row of cells 14 forming the perimeter of the cell groups, thus providing equal contact between the surfaces of the radiator plates 22 and the corresponding outer surface of the cells therein. This in turn realizes even heat transfer from the cells 14 to the radiator plates According to the above embodiment, the battery pack 1 has a dual structure in which the cells 14 are housed in the inner case 13, which is in turn contained within the outer enclosure 2 with the first air passages 24 and the second air passage 25 separated from the cells 14. Additionally, the radiator plates 22 are provided in the part of the first air passages 24 and the second air passage 25 where they come into contact with the outer surfaces of the cell groups, with each radiator plate including fins 23, the number of which increases toward the downstream direction of the cooling airflow. This results in a greater heat capacity of each radiator plate 22 within the downstream direction of the airflow and thus ensures an appropriate cooling effect of the plates 22 despite increases in temperature of cooling air downstream. Due to this arrangement, as the cells have an even temperature distribution, i.e., the relative temperatures of the cells 14 are maintained at about the same level, resulting in an increase in the overall service life of the battery. Moreover, the provision of the fins 23 advantageously and easily augments the surface area and volume of the plate and thus the overall heat capacity of each radiator plate 22.

As an additional advantage of the embodiment, the surfaces of the radiator plates 22 correspond in shape to the projections and recesses of the outer surfaces the cells 14 forming the perimeter of the cell groups, thus providing equal contact between the surfaces of the radiator plates 22 and the corresponding outer surface of the cells therein and realizing even heat dissipation or cooling of the cells.

Figure 11:
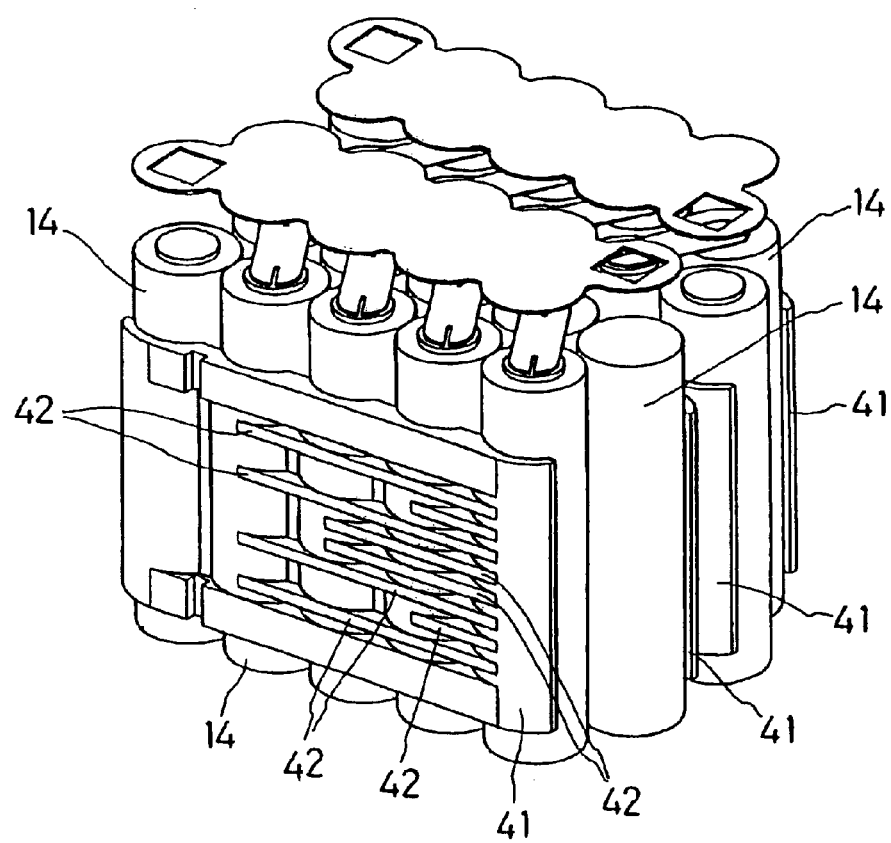
FIG. 11 is a perspective view showing a modification of the radiator plates of the battery pack shown in FIG. 1.

It should be noted that the shape of the radiator plate is not limited to that described in the foregoing. As shown in FIG. 11, an alternative radiator plate 41 with a greater height and an accordingly increased provision of fins 42 may be employed depending on the height of the cells used. Furthermore, instead of providing a rectangular radiator plate (22 or 41) for each row of cells, a U-shaped or horseshoe shaped radiator plate may be employed to surround two rows of cells. Alternatively, shorter radiator plates having different numbers of fins may be connected in the longitudinal direction. The invention can be practiced with these or other modifications. Furthermore, the heat capacity of the radiator plates may be increased in a number of ways: each radiator plate may be formed gradually thicker in the downstream direction of the airflow; protrusions rather than fins may be formed on the surface of the plate with their number gradually increased downstream; the similar effects may be realized by changing either the surface area or the volume only. Although fins oriented in parallel to the cooling airflow is the most preferred configuration due to their airflow straightening or adjusting effect, rib-like structures that protrude farther from the surface of the radiator plate may also suffice.

The foregoing embodiment employs a fully double-structured casing in which air passages are defined between the outer case and the inner case, which holds the cells. Instead, air passages may be formed merely by partition walls within the outer case. In this modification, the radiator plates are disposed in the partition walls so as to be brought into contact with portions of the cells.

Embodiment 2

An alternative embodiment of the present invention will be described hereinafter with reference to the attached drawings. This embodiment differs from the previous embodiment only in the arrangement of the cells and the structure for providing cooling effects. Accordingly, identical or similar reference numerals or characters denote identical or similar parts or elements throughout the several views. Therefore, description of such elements as well as description of common structures is omitted.

Figure 12:
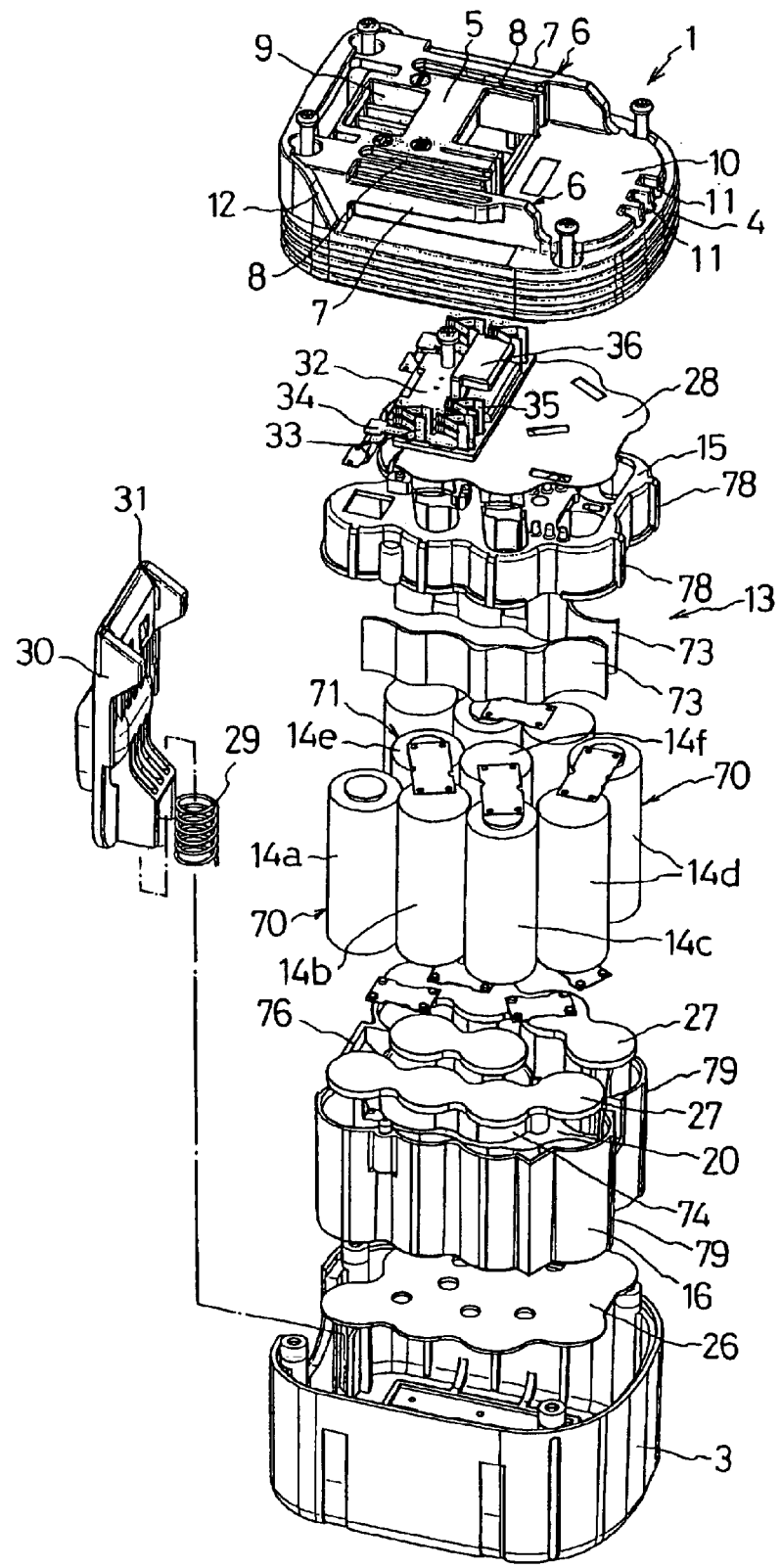
FIG. 12 is an exploded perspective view of a battery pack of an alternate embodiment.
Figure 13:
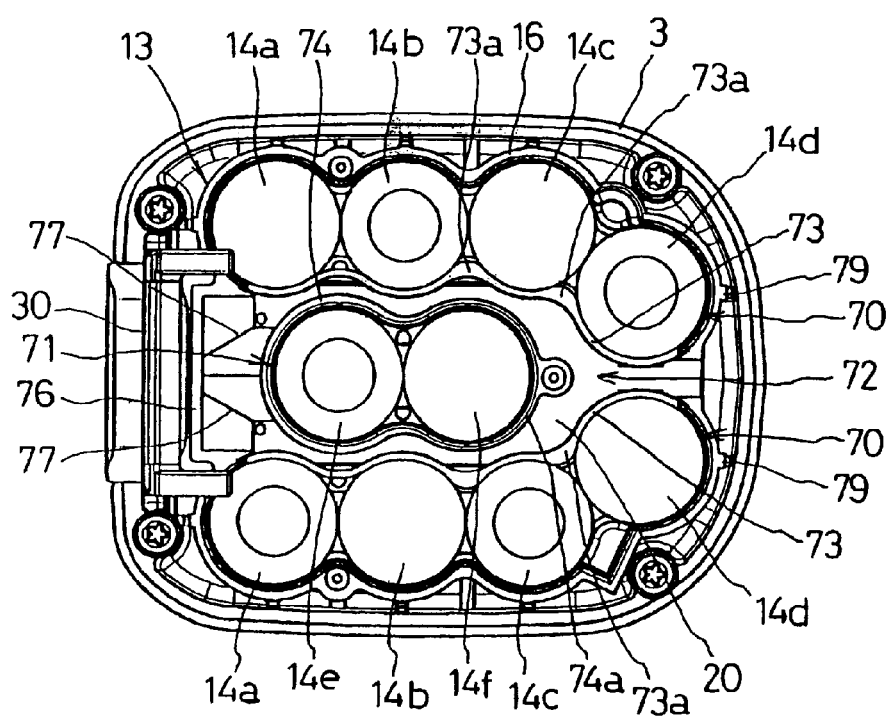
FIG. 13 is top plan view of the battery pack of FIG. 11 with the upper enclosure and the upper holder removed.
Figure 14:
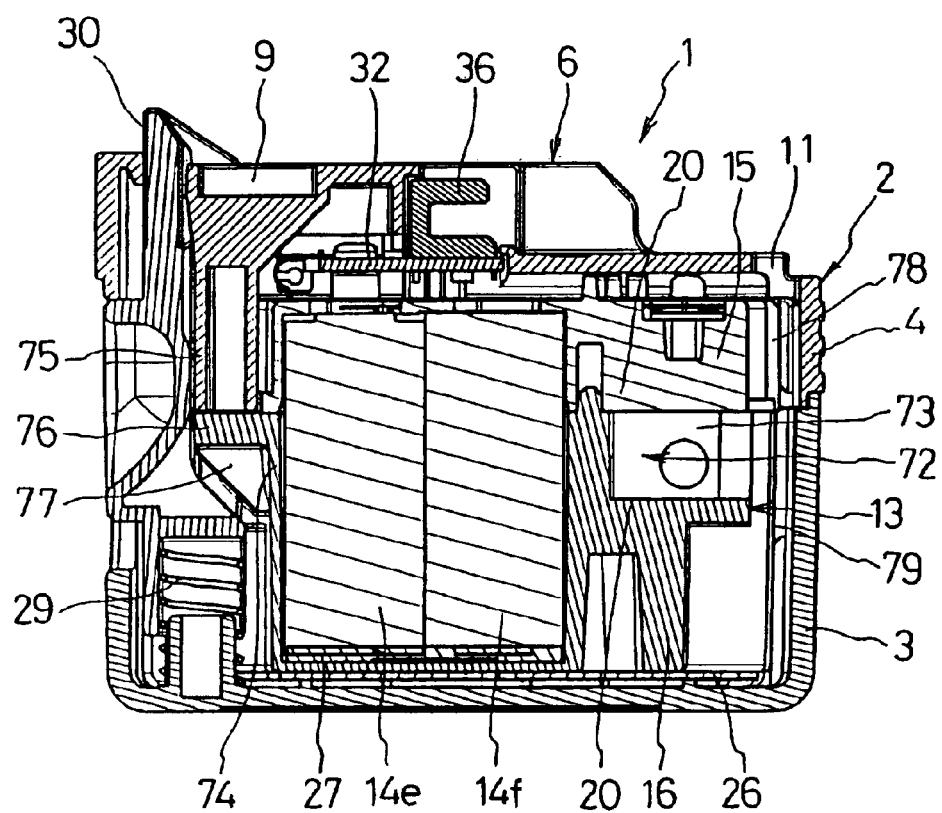
FIG. 14 is a transverse sectional view of the battery pack of FIG. 11 taken along a longitudinal center line through the battery pack.

FIG. 12 shows the battery pack 1 in which ten fewer cells than in the first embodiment are contained, with each cell being a 12-volt cell. The inner case 13 contains two symmetrically arranged cell groups 70, each group or row including four cells 14a, 14b, 14c, and 14d, with a third group 71 of two cells 14e and 14f interposed between the cell groups 70. As shown in FIGS. 13 and 14, due to the fewer number of cells than provided in the first embodiment, no air passage is provided along the outer surfaces of each cell group 70; rather, a forked air passage 72 is defined by the opposing inner surfaces of the cell groups 70 and the horizontal partition plates 20 of the upper and lower holders 15 and 16. Additionally, the cell group 71 is positioned in the middle of the space thus defined so as to bifurcate it into the air passage 72. The battery pack 1 also includes two metal radiator plates 73 provided on the opposing inner surfaces of the cell groups 70 and a synthetic resin radiator plate 74 that completely surrounds the cell group 71. Both radiator plates 73 and 74 are corrugated in such a manner as to conform to the outside surfaces of the corresponding cell group. As with the radiator plates of the first embodiment, the radiator plates 73 are assembled between the upper and lower holders 15 and 16 in contact with the cells 14a–14d, whereas the circular radiator plate 74 is formed integrally in the lower holder 16.

Figure 15:
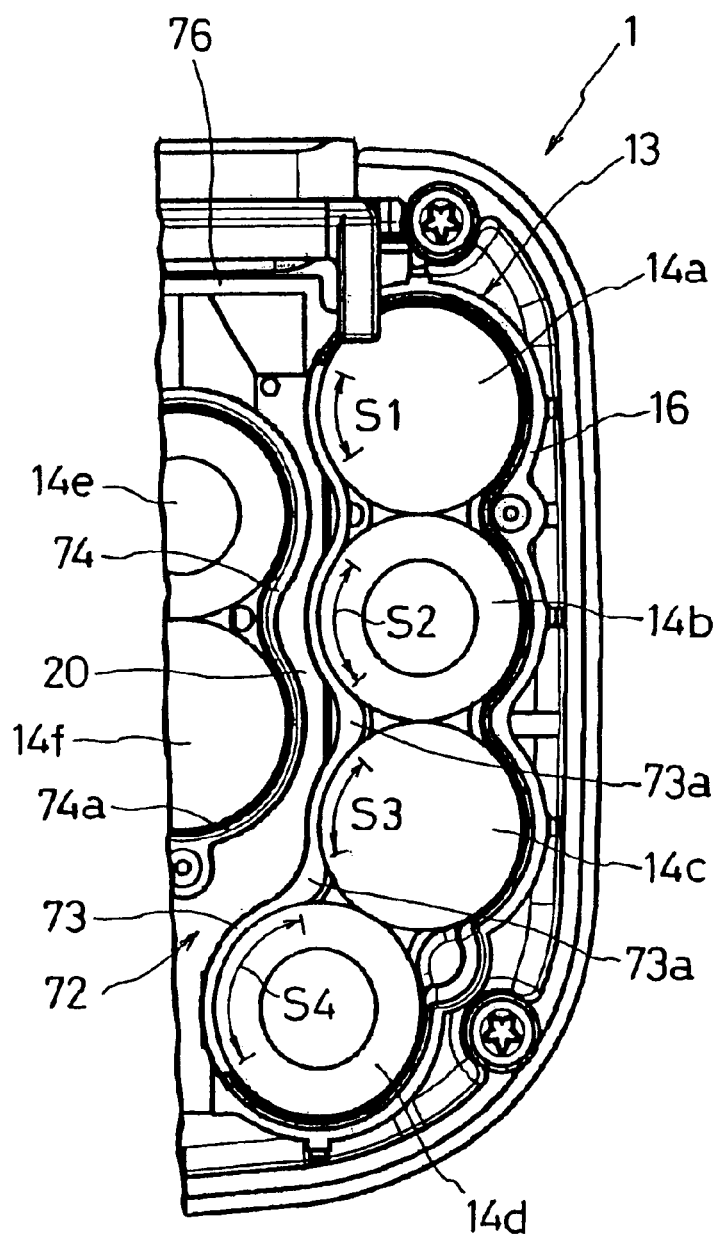
FIG. 15 is an enlarged top plan view of part of the battery pack of FIG. 11 detailing the structure of radiator plates.

With reference to FIG. 15, each radiator plate 73 has portions with differing surface areas in circumferential contact with the cells 14a–14d. More particularly, the cell 14d, positioned farthest downstream, has the greatest area of contact (S4) with the radiator plate 73, with the second most upstream cell 14b having the second greatest area of contact (S2), the second most downstream cell 14c having the third greatest area of contact (S3), and the most upstream cell 14a having the least area of contact (S1). The reason for the contact areas generally increasing downstream is that as the temperature of the cooling air through the air passage 72 increases as it flows downstream by heat exchange with upstream cells, a sufficient cooling effect could not otherwise be expected on downstream cells, such as the cell 14d, if the contact area were the same for each cell. On the other hand, the areas of the second most upstream and third most upstream cells 14b and 14c are made greater than that of the most upstream cell 14a because these cells, being interposed between other cells, are less effectively cooled for the same area of contact.

Being interposed between two adjacent cells, the third cell 14c should require a greater area of contact with the radiator plate than the second cell 14b does if the aforementioned desired cooling effect of the cell group is attained. However, a sufficient area of contact cannot be secured for this cell as the cells are not arranged straight but curved toward the side of the cells where the radiator plate 73 is located. Instead, the radiator plate 73 includes two bulges 73a on both edges of the plate's contact area with the third cell 14c. These bulges are thicker than the other parts of the radiator plate. This increases the heat capacity of the radiator plate 73 for the cell 14c and enhances the cooling effect on the cell 14c.

As mentioned above, the radiator plate 74 for the cell group 71 is made of synthetic resin integrally formed with the lower holder 16. Even though this radiator is not made of metal, the same degree of a cooling effect is expected on this centrally positioned cell group because this group contains only two cells, thus requiring less cooling, and also because its radiator plate 74 is exposed to cooling air around its entire peripheral wall. However, considering increases in temperature of the cooling air as it proceeds downstream, the portion 74a of the radiator plate 74 that surrounds and comes into contact with the downstream cell 14f is made thinner than the portion of the plate that surrounds and comes into contact with the upstream cell 14e so as to realize an equal cooling effect on both cells 14e and 14f.

With reference to FIGS. 14 and 15, the lower holder 16 of the inner case 13 includes a guide passage 76 which opens upwardly therein. The upper enclosure 4 includes a cylindrical channel 75 extending downward from the intake port 9. The cylindrical channel 75 is connected to and vertically aligned with the guide passage 76 so as to place the entrance to the air passage 72 in hermetic communication with the intake port 9. The guide passage 76 includes at its bottom two "valleys" or funnels 77 to facilitate flow of cooling air into the respective forks or branches of the air passage 72 (as best shown in FIG. 13). Reference numerals 78 and 79 designate airflow straightening ribs provided vertically on the front surfaces of the upper and lower surfaces 15 and 16, respectively. The ribs 78 and 79 abut the inner surfaces of the outer enclosure 2 upon assembly of the battery pack so as to direct the cooling air from the outlet of the air passage 72 into the discharge ports 11.

To charge the battery pack 1 so constructed, the pack is engaged by the guide rails 55 of the charger 50, as in the first embodiment. Upon attachment of the device to the charger 50, the pack's intake port 9 is positioned directly above the airflow passageway 66 of the charger 50, thus establishing communication of the air passages between the two devices.

Upon commencement of charging, the fan 63 sends cooling air into the outer enclosure 2 via the airflow passageway 66 of the charger 50, the pack's intake port 9, and the cylindrical channel 75. Thereupon, the cooling air flows through the guide passage 76 of the lower holder 16 and the air passage 72 within the inner enclosure 13 and eventually exits to the exterior of the battery pack 1 through the discharge ports 11, while suppressing increases in temperature of the cells by cooling the radiator plates 73 and 74. Particularly in this embodiment, different materials are selected for the radiator plates 73 and 74 in consideration of the difference in the heat conditions between the respective cell groups. Furthermore, the cells in the cell group 70 have different areas of contact with the radiator plate 73, and each of the radiator plates 73 and 74 includes portions having different thicknesses. The purpose of these features of the radiator plates is to provide a suitable heat capacity for different plate portions that are brought into contact with cells with different heat buildup characteristics. Accordingly, these arrangements can effectively cope with variations in the temperature of the cells 14a–14f, for example, due to increase in temperature of the cooling air downstream, maintaining a proper temperature balance among the cells 14a–14f. This addresses the problem of certain cells reaching the end of their life span faster than others, thus increasing the service life of the entire battery more effectively than the arrangement of the first embodiment. Moreover, the charging time is shortened as the cells of this embodiment are well protected against excessive heat buildup. That is, in conventional battery chargers, the charging circuitry is protected by a reduction in the charging current, which results in longer charging times. However, the relationship between temperature and charging time also means that cooling allows the charging current to be similarly increased, thus shortening the charging time.

According to this embodiment, as the heat capacity of the radiator plates 73 and 74 and the distribution of heat capacity in each type of plate are adjusted by the selection of different materials for the plates 73 and 74, the use of differing areas of contact of the cells in each group 70 with the plate 73, and the provision of portions with different thicknesses in the plates 73 and 74, the heat capacity of different plates and/or different portions of the plates can be more easily and effectively adjusted. If more than one of these arrangements/means are combined, adjustment of the heat capacity of the plates becomes even easier and more accurate.

In the second embodiment, all three features (i.e., the selection of different materials for the plates 73 and 74, the use of differing areas of contact of the cells in each group 70 with the plate 73, and the provision of portions with different thicknesses in the plates 73 and 74) are employed; however, one or two of the features may be adopted if a proper temperature balance or even temperature distribution can be attained among the cells.

The second embodiment includes a central air passage provided through the middle of the inner case 13. Three of the means mentioned above (i.e., the selection of different materials for different types of plates, the use of differing areas of contact of the cells in each group with the plate, and the provision of portions with different thicknesses in the plates) can be still employed in a battery pack with two air passages provided along the outside surfaces of two cell groups, as in the first embodiment.

The material for the metal radiator plate can be selected, for example, from a group consisting of aluminum, copper, and iron in order to achieve even temperature distribution among the cells. Furthermore, in a single radiator plate, a number of materials can be used to come into contact with different cells. The thickness distribution and/or areas of contact in any of the radiation plates can also be changed depending on the number and arrangement of cells in the cell groups and the configuration of the air passages. For example, a cell's area of contact with a radiator plate can be adjusted by increasing or decreasing the contact area along the axis of the cell rather than along the circumference of the cell as in this embodiment.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A battery pack, comprising:
   a case containing a plurality of cells,
   at least one air passage formed within the case for allowing cooling air outside the case to enter the case and to pass at least one of along and between the cells, and exit from the case, and
   at least one radiator provided in the at least one air passage so as to be in contact with an outer surface of the cells, wherein the heat capacity of the at least one radiator increases in the downstream direction of a flow of the cooling air.

2. A battery pack in accordance with claim 1, wherein said increase in the heat capacity is achieved by increasing at least one of the surface area and the volume of the at least one radiator.

3. A battery pack in accordance with claim 1, wherein each radiator has a cross section, transverse to the direction of the flow of the cooling air, that progressively increases in size along said direction of the flow.

4. A battery pack in accordance with claim 1, wherein each radiator is contoured to conform to the outer surfaces of the cells.

5. A battery pack in accordance with claim 1, wherein each radiator is a generally rectangular plate having an inner surface contoured to conform to the outer surfaces of the cells and an outer surface opposite the inner surface, the outer surface of each plate having a plurality of radiator fins thereon protruding into the respective air passage.

6. A battery pack in accordance with claim 5, wherein the radiator fins of each plate include a plurality of horizontal fins with different lengths, the fins being arranged in parallel both with respect to any of the other fins in the plate and to the direction of the cooling airflow such that the heat capacity of each radiator increases in the downstream direction of the cooling air.

7. A battery pack in accordance with claim 5, wherein the number of fins of each radiator plate increases in the downstream direction of the cooling airflow.

8. A battery pack, comprising:
a first case containing a plurality of cells,
a second case enclosing the first case,
at least one air passage formed within the first case for allowing cooling air outside the first case to enter the first case at an upstream portion of the at least one air passage and to pass at least one of along and between the cells, and exit from the first case at a downstream portion of the at least one air passage, and
radiator means provided in the at least one air passage so as to be in contact with an outer surface of each of the cells, the radiator means having a plurality of portions each corresponding to each of the cells, wherein the portions have different heat capacities according to a heat load of the corresponding cell.

9. A battery pack in accordance with claim 8, wherein the heat capacity of each portion of the radiator means is determined by the area of contact of the portion with the corresponding cell.

10. A battery pack in accordance with claim 8, wherein the heat capacity of each said portion of the radiator means is determined by the thickness of the portion.

11. A battery pack in accordance with claim 8, wherein the heat capacity of each said portion of the radiator means is determined by the material of the portion.

12. A battery pack in accordance with claim 8, wherein the heat capacity of each said portion of the radiator means is determined by any combination of the area of contact of the portion with the corresponding cell, the thickness of the portion, and the material of the portion.

13. A battery pack in accordance with claim 8, wherein the cells are divided into at least one first cell group and at least one second cell group, each of said cell groups including at least one cell, and the radiator means includes a plurality of radiator plates having different heat capacities, each radiator plate being in contact with one of the first and second cell groups.

14. A battery pack in accordance with claim 13, wherein the battery pack comprises one first cell group located generally in the center thereof and two second cell groups opposing the first cell group along branches of the at least one air passage.

15. A battery pack in accordance with claim 14, wherein the radiator plates include a first radiator plate and two second radiator plates, the first radiator plate surrounding the first cell group at its outer periphery and each of the second radiator plates abuts inner surfaces of one of the second cell groups, and wherein the first radiator plate has a smaller heat capacity than each of the second radiator plates.

16. A battery pack in accordance with claim 15, wherein the first radiator plate is made of a synthetic resin and each second radiator plate is made of at least one metal selected from a group consisting of aluminum, copper and iron.

17. A battery pack in accordance with claim 15, wherein the portions of the second radiator plate become thicker in a stepwise manner along the downstream direction of a flow of the cooling air.

18. A battery pack in accordance with claim 15, wherein the first radiator plate and the second radiator plates have a plurality of portions adapted to correspond to locations of different cells in the battery pack and adapted to remove heat from the corresponding cells at each portion, said portions having different heat capacities according to the heat loads of the corresponding cells.

19. A battery pack in accordance with claim 18, wherein the heat capacity of each portion of each second radiator plate is determined by the area of contact of the portion with the corresponding cell.

20. A battery pack in accordance with claim 18, wherein the heat capacity of each portion of the first and second radiator plates is determined by the thickness of the portion.

21. A battery pack in accordance with claim 15, wherein the heat capacity of each portion of each second radiator plate is determined by any combination of the area of contact of the portion with the corresponding cell and the thickness of the portion.

22. A battery pack in accordance with claim 14, wherein the second cell groups are symmetrical and include an equal number of cells and the first cell group includes fewer cells than each of the second cell groups.

23. A battery pack in accordance with claim 14, wherein each second cell group has inner surfaces in contact with one of the second radiator plates, and each second cell group is arranged in a single row of cells bent at one intermediate cell toward the inner surface, the portion of each second radiator plate corresponding to the intermediate cell includes two bulges adjacent to the intermediate cell so that the intermediate cell interposes therebetween.

24. A battery pack in accordance with claim 23, wherein each bulge is thicker than the remainder of the second radiator plate.

25. A battery pack, comprising:
a case containing a plurality of cells, the cells being divided into at least one first cell group and at least one second cell group, each of said cell groups including at least one cell, and the at least one first cell group is located generally in the center of the battery pack,
at least one air passage formed within the case for allowing cooling air outside the case to enter the case at an upstream portion of the at least one air passage and to pass at least one of along and between the cells, and exit from the case at a downstream portion of the at least one air passage, and wherein at least two of the second cell groups oppose the at least one first cell group along branches of the at least one air passage, and
radiator means provided in the at least one air passage so as to be in contact with an outer surface of each of the cells, the radiator means having a plurality of portions each corresponding to each of the cells to form a plurality of radiator plates having different heat capacities, each radiator plate being in contact with one of the at least one first cell group and one of the at least one second cell group, wherein the portions have different heat capacities according to a heat load of the corresponding cell, wherein the heat capacity of each portion of the radiator means is determined by the area of contact of the portion with the corresponding cell.

26. A battery pack in accordance with claim 25, wherein the heat capacity of each portion of the radiator means is further determined by the thickness of the portion.

27. A battery pack in accordance with claim 25, wherein the heat capacity of each said portion of the radiator means is further determined by the material of the portion.

28. A battery pack in accordance with claim 25, wherein the heat capacity of each said portion of the radiator means is further determined by any combination of the area of contact of the portion with the corresponding cell, the thickness of the portion, and the material of the portion.

29. A battery pack in accordance with claim 25, wherein the radiator plates include a first radiator plate and two second radiator plates, the first radiator plate surrounding the first cell group at its outer periphery and each of the second radiator plates abuts inner surfaces of one of the second cell groups, and wherein the first radiator plate has a smaller heat capacity than each of the second radiator plates.

30. A battery pack in accordance with claim 29, wherein the first radiator plate is made of a synthetic resin and each second radiator plate is made of at least one metal selected from a group consisting of aluminum, copper, and iron.

31. A battery pack in accordance with claim 29, wherein the portions of the second radiator plate become thicker in a stepwise manner along the downstream direction of a flow of the cooling air.

32. A battery pack in accordance with claim 29, wherein the first radiator plate and the second radiator plates have a plurality of portions adapted to correspond to locations of different cells in the battery pack and adapted to remove heat from the corresponding cells at each portion, said portions having different heat capacities according to the heat loads of the corresponding cells.

33. A battery pack in accordance with claim 32, wherein the heat capacity of each portion of the first and second radiator plates is determined by the area of contact of the portion with the corresponding cell.

34. A battery pack in accordance with claim 32, wherein the heat capacity of each portion of the first and second radiator plates is determined by the thickness of the portion.

35. A battery pack in accordance with claim 29, wherein the heat capacity of each portion of each second radiator plate is determined by any combination of the area of contact of the portion with the corresponding cell and the thickness of the portion.

36. A battery pack in accordance with claim 25, wherein the second cell groups are symmetrical and include an equal number of cells and the first cell group includes fewer cells than each of the second cell groups.

37. A battery pack in accordance with claim 25, wherein each second cell group has inner surfaces in contact with one of the second radiator plates, and each second cell group is arranged in a single row of cells bent at one intermediate cell toward the inner surface, the portion of each second radiator plate corresponding to the intermediate cell includes two bulge adjacent to the intermediate cell so that the intermediate cell interposes therebetween.

38. A battery pack in accordance with claim 37, wherein each bulge is thicker than the remainder of the second radiator plate.

* * * * *